Figure 1:
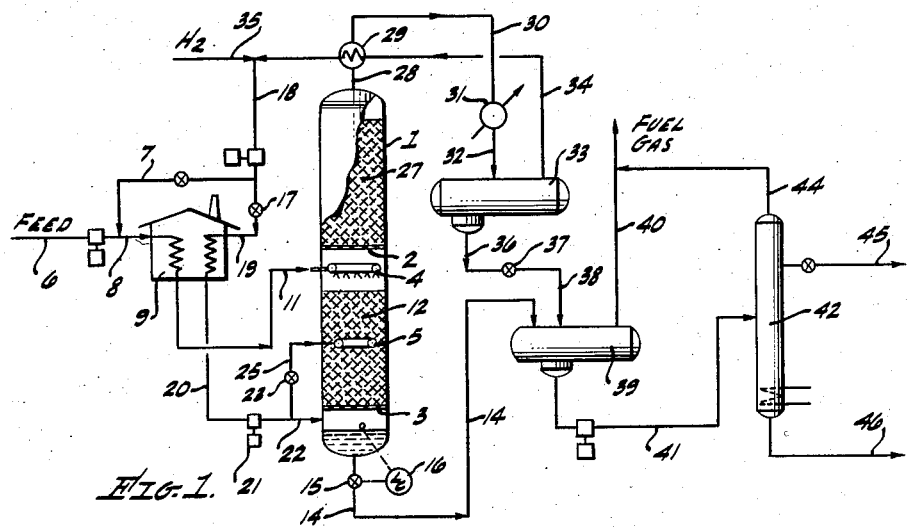

July 22, 1958 T. V. INWOOD 2,844,517
HYDROCARBON DESULFURIZATION PROCESS
Filed July 26, 1954

INVENTOR.
TEXAS V. INWOOD,
BY
Lannas S. Henderson
AGENT.

United States Patent Office 2,844,517
Patented July 22, 1958

2,844,517

HYDROCARBON DESULFURIZATION PROCESS

Texas V. Inwood, La Habra, Calif., assignor to Union Oil Company of California, Los Angeles, Calif., a corporation of California Application July 26, 1954, Serial No. 445,704

16 Claims. (Cl. 196—28)

This invention relates to the desulfurization of mineral oil hydrocarbon fractions by the selective hydrogenation thereof in the presence of certain catalysts. Such processes are often referred to generally an "hydrodesulfurization." They embody essentially the treatment of hydrocarbon fractions at temperatures between about 500° and 850° F., generally at super-atmospheric pressures, in the presence of hydrogen and a catalyst, whereby organic sulfur components are selectively hydrocracked to produce hydrogen sulfide and hydrocarbon fragments. At the same time, any organic nitrogen bases are largely decomposed to ammonia and hydrocarbons. The original hydrocarbon components are affected mainly in that the unsaturates, and some of the aromatics may be hydrogenated. These processes are distinguished from the endothermic, hydrogen-producing type of conversion known as reforming, or hydroforming, wherein somewhat higher temperatures, and/or lower space velocities are employed in order to effect rearrangement of hydrocarbons, as by cyclization, aromatization, isomerization, and the like, whereby the knock rating of the gasoline is improved.

The present invention is directed particularly to the hydrodesulfurization of petroleum fractions which boil over a considerable temperature range, and more particularly those wide-range fractions wherein the higher boiling portions boil in the temperature region between about 400° and 1000° F. In treating such hydrocarbon fractions of mixed boiling points, it is the general practice to heat them to the desired reaction temperature, mix therewith, either before or after heating, the desired portion of preheated hydrogen, and then pass the resulting mixture into the top of a reactor containing a bed of granular catalytic material. The feed mixture plus hydrogen so admitted, at reactor pressures, comprises both a liquid phase and a gaseous phase. The gas phase is composed largely of hydrogen and lower-boiling hydrocarbons from the feed. The liquid phase is composed largely of hydrocarbons in the higher boiling ranges plus dissolved hydrogen. The liquid phase trickles downwardly in the reactor, covering the catalyst particles with a film of liquid, which also penetrates into the interior of the catalyst particles. The gas stream moves at a much faster linear rate than the liquid stream, and since the liquid phase largely covers the exterior surface of the catalyst particles, the gas phase can make contact with the bulk of the active centers of the catalyst only by the relatively slow process of diffusion through the liquid barrier. This factor has been found to lower the overall efficiency of conventional desulfurization processes to a considerable extent, specifically by lowering the efficiency of the gas-phase conversion.

It has also been found that in catalytic hydrodesulfurization, the liquid phase feed material requires different optimum conditions for its treatment than the vapor phase. This is due partly to the much lower diffusion coefficients of liquids, and the laminar nature of liquid flow. Consequently for solely liquid phase conversions, it is necessary to employ more finely divided catalyst, and/or lower liquid hourly space velocities than are permissible with wholly gas phase conversions under otherwise similar process conditions to obtain comparable desulfurization. In view of all the above, it is desirable to treat as much of the stock as possible while in the vapor phase, and at the same time to perform any vapor phase conversion in the absence of the liquid phase.

However, it is not feasible to treat all feed stocks wholly in the vapor phase. Obviously, any feed stock could be completely vaporized, but not at temperatures, pressures and hydrogen ratios which are necessary and/or economical in the process. Excessively high temperatures and/or low pressures promote hydrocarbon cracking and catalyst fouling, while large hydrogen recycle rates are uneconomical.

According to the present invention, the difficulties involved in mixed liquid-phase, gas-phase conversions are overcome by separately contacting the portion of the feed material which may be economically maintained in vapor phase at process conditions with the catalyst in one contacting zone, and separately treating the liquid portion of the feed material in another contacting zone. At the same time, maximum vapor phase treatment is assured by equilibrating under process conditions the high-boiling portions of the feed mixture with the hydrogen which is to be employed in the gas phase conversion, thereby vaporizing a considerable portion of the higher boiling fraction for treatment in the gas phase conversion zone.

A principal object of the invention therefore is to improve the efficiency of vapor-phase desulfurization by insuring the absence therefrom of a liquid phase. Another object is to minimize the amount of liquid phase conversion which is necessary for any given feed stock by insuring that prior to treatment of said liquid phase, as large a portion thereof as practical is converted to the vapor phase by entrainment with hydrogen. An overall object is to obtain maximum efficiency in catalytic hydrodesulfurization in terms of feed treating capacity per volume of catalyst bed per hour. A more specific object is to provide optimum procedures for fractionating wide-boiling range stocks in the presence of hydrogen whereby the maximum amount of feed stock may be converted to the vapor phase. A corollary object is to provide catalysts which are particularly adapted for the respective vapor phase and liquid phase conversion zones. Another object is to provide conditions of optimum efficiency for such liquid phase conversion as is necessary. Other objects and advantages will be apparent to those skilled in the art from the description which follows.

The accompanying drawings are process flow diagrams illustrating three possible modifications for carrying out the process. These figures will be explained in more detail hereinafter.

As indicated above, the essential feature involved in the present invention consists in separating hydrocarbon stocks into a vapor phase and a liquid phase, vaporizing an additional portion of the normally liquid phase by contact with preheated hydrogen, the preheated hydrogen preferably being the amount required for the vapor phase conversion, then treating the combined vapor phases under more or less conventional conditions, and separately treating the liquid phase under conditions designed especially for liquid phase conversion. The separation of vapor phase and liquid phase products may be carried out by two general methods. According to one method the initial feed stock is simply admixed with the amount of hydrogen required for treatment of the vaporized products, and the resulting mixture is passed through a pre-heater wherein the degree of agitation and time of contact is sufficient to saturate the hydrogen with vapors of the hydrocarbons, and the heated mixture is then injected into the mid-portion of a vertical catalyst-containing vessel. Ordinarily, the mixed feed is introduced through a spray device or header so that the vapors and liquids are distributed evenly over the reactor cross-section. The liquid phase is then allowed to gravitate downwardly through the lower section of the catalyst bed, while a restricted lower outlet in the reactor forces the gas phase to move upwardly through the upper portion of the catalyst bed. As the liquid phase gravitates downwardly, it is desirable to add thereto at one or more levels additional hydrogen in order to replenish the dissolved hydrogen which is consumed in the liquid phase desulfurization. This additional hydrogen may be added at the lower extremity of the liquid phase conversion zone, or it may be added at various levels throughout said zone. The hydrogen added should be sufficient to maintain the liquid phase saturated with hydrogen, and preferably should be sufficient to provide a slight excess so that the downwardly moving liquid will be continuously agitated, thereby improving contact with the catalyst. The conversion rate in the liquid phase is directly proportional to the solubility of hydrogen in the liquid phase under the temperature and pressure conditions prevailing in the reactor. Ordinarily there is no advantage in providing excess hydrogen, except for its value in providing agitation.

The reaction conditions in the liquid phase zone may be considerably different from those in the vapor phase zone. The prevailing temperatures in the liquid phase zone may be between about 500° and 800° F., while those in the vapor phase zone are preferably somewhat higher e. g. 600° to 900° F. The pressure in the vapor phase zone may range from atmospheric to 10,000 p. s. i. g. and preferably between about 400 and 2,000 p. s. i. g. The liquid phase conversion zone may be maintained at the same pressure conditions, but more rapid conversion rates result by employing somewhat higher pressures e. g. from about 500 to 12,000 p. s. i. g., preferably about 1000 to 5000 p. s. i. g. The liquid hourly space velocity (volumes of liquid feed per volume of catalyst per hour) in the vapor phase conversion zone will generally range between about 1 and 20, preferably between about 2 and 10. The liquid phase zone however may be operated at space velocities between about 0.05 and 10.0, preferably between about 0.1 and 5.0. Hydrogen supply rates in the vapor phase zone may range between about 200 and 8000 s. c. f. per barrel of feed and preferably between about 500 and 3000 s. c. f. per barrel. In the liquid phase zone however, the hydrogen rates may be between about 50 and 1000 s. c. f. per barrel and preferably between about 75 and 300 s. c. f. per barrel.

An exception to the above hydrogen circulation rates for the liquid phase zone should be noted in connection with the second of the above-mentioned general methods for separating the vapor phase from the liquid phase feed material. According to this modification only a part, or even none, of the hydrogen required in the vapor phase conversion is admitted to the reactor simultaneously with the vapor phase fraction. All or a part of the total hydrogen is first passed through the liquid phase conversion zone thereby utilizing the liquid phase zone as an auxiliary hydrocarbon feed vaporizer, and the resulting mixture of hydrogen and vaporized high boiling hydrocarbons is then mixed with the main stream of vapor phase feed and passed through the vapor phase conversion zone. This modification may be employed by preheating the feed without the addition of hydrogen, or with the addition thereto of only a portion of that required. This mixed phase feed is then admitted to the reactor as previously described, and the remainder of the hydrogen required for the vapor phase conversion is admitted at higher pressures to the lower portions of the liquid phase conversion zone. The hydrogen so admitted passes upwardly countercurrently to the descending liquid, entraining a portion thereof as vapor for conversion in the upper zone.

Where it is desired to treat the liquid phase under higher pressures than the vapor phase, the preheated total feed mixture may be passed through a preliminary high pressure separator, whereby the vapor phase may be separated and passed into the vapor phase reactor at the desired pressure, and the liquid phase in the separator may be separately pumped into a high pressure reactor. In this modification also, the hydrogen required for the vapor phase conversion may be supplied to the preliminary separator along with the feed, or all or a part thereof may be passed through the high pressure liquid phase reactor, and thence into the vapor phase converter.

The liquid phase reaction zone may be operated under a variety of contacting conditions. The liquid may be allowed to fall freely over the exterior surface of the catalyst particles, thereby providing essentially laminar flow at a fairly constant rate, and leaving void spaces between the catalyst particles for the countercurrent passage of hydrogen. Alternatively a liquid level may be maintained in the catalyst bed, and the hydrogen bubbled therethrough. In the latter alternative it may in some cases be difficult to maintain straight-through flow conditions, such as would provide true multi-stage conversion. In such cases, the liquid phase zone may be divided into a plurality of smaller zones which are separated from each other in such manner as to prevent the extensive mixing of reacted hydrocarbons with relatively unreacted hydrocarbons. This type of operation may be performed for example in a conventional bubble-cap column wherein the catalyst is maintained in each of the plates thereof as a stationary or moving body. The catalyst employed in the liquid phase zone should preferably be more finely divided than the catalyst in the vapor phase zone. In fact, in the liquid phase conversion very finely divided catalyst may be employed, (25–100 mesh) such that a slurry is formed. Such finely divided catalysts are ordinarily not preferred in the vapor phase zone because of the excessive pressure drop required to obtain the desired gas velocity therethrough. By employing finely divided catalyst, the liquid phase conversion may be carried out at substantially higher space velocities than where large pellets are employed. Utilizing 25–100 mesh catalyst, the conversion may be carried out at e. g. about 1 to 8 liquid hourly space velocity.

The catalysts employed in the separate desulfurization zones herein may comprise any of the transitional metals, metal oxides, metal sulfides, or other metal salts which are known to catalyze hydrodesulfurization, and are not poisoned by hydrogen sulfide or other sulfur compounds. The preferred catalysts comprise the oxides and/or sulfides of the metals in groups VIB and VIII of the periodic table, as for example the oxides or sulfides of molybdenum, tungsten, iron, cobalt, nickel, chromium and the like. Vanadium compounds may also be employed in some cases. A particularly active combination consists of a group VIB metal oxide or sulfide with a group VIII metal oxide or sulfide. For example compositions containing both molybdenum oxide and cobalt oxide, molybdenum oxide and nickel oxide, tungsten sulfide and nickel sulfide, and the like may be employed. The catalysts employed in the two desulfurization zones may be the same or different.

A particularly active catalyst consists of the composite known as cobalt molybdate, which actually may be a mixture of cobalt and molybdenum oxides wherein the atomic ratio of Co to Mo may be between about 0.4 and 5.0. This catalyst, or any of the above catalysts may be employed in unsupported form, or alternatively it may be distended on a suitable adsorbent oxide carrier such as alumina, silica, zirconia, thoria, magnesia, titania, bauxite, acid-activated clays, or any combination of such materials. Of the foregoing carriers, it has been found that the preferred material is alumina and especially alumina containing about 3–12% by weight of silica. Supported cobalt molybdate catalysts should preferably contain about 7 to 22% by weight of the oxides of cobalt and molybdenum.

In the preparation of an unsupported cobalt molybdate catalyst the catalyst can be coprecitated by mixing aqueous solutions of, for example, cobalt nitrate and ammonium molybdate, whereby a precipitate is formed. The precipitate is filtered, washed, dried and finally activated by heating to about 500° C. Alternatively, the cobalt molybdate may be supported on alumina by coprecipitating a mixture of cobalt, aluminum and molybdenum oxides. A suitable hydrogel of the three components can be prepared by adding an ammoniacal ammonium molybdate solution to an aqueous solution of cobalt and aluminum nitrates. The precipitate which results is washed, dried and activated. In still another method a washed aluminum hydrogel is suspended in an aqueous solution of cobalt nitrate and an ammoniacal solution of ammonium molybdate is added thereto. By this means a cobalt molybdate gel is precipitated on the alumina gel carrier. Catalyst preparations similar in nature to these and which can also be employed in this invention have been described in U. S. Patents 2,369,432 and 2,325,033.

Still other methods of catalyst preparation may be employed such as by impregnating dried carrier material, e. g. an alumina-silica gel, with an ammoniacal solution of cobalt nitrate and ammonium molybdate. Preparations of this type of cobalt molybdate catalyst are described in U. S. Patent 2,486,361. In yet another method for preparing impregnated cobalt molybdate catalyst the carrier may be first impregnated with an aqueous solution of cobalt nitrate and thereafter impregnated with an ammoniacal molybdate. Alternatively, the carrier may be impregnated with both solutions in reverse order. Following the impregnation of the carrier by any of the foregoing methods the material is drained, dried and finally activated in substantially the same manner as is employed for the other catalysts. In the preparation of impregnated catalysts where separate solutions of cobalt and molybdenum are employed, it has been found that it is preferable to impregnate the carrier first with molybdenum, e. g., ammoniacal ammonium molybdate, and thereafter to impregnate with cobalt, e. g. aqueous cobalt nitrate, rather than in reverse order.

In yet another method for the preparation of suitable catalyst a gel of cobalt molybdate can be prepared as described hereinbefore for the unsupported catalyst, which gel after drying and grinding can be mixed with a ground alumina, alumina-silica or other suitable carrier together with a suitable pilling lubricant or binder which mixture can then be pilled or otherwise formed into pills or larger particles and activated.

In yet another modification finely divided or ground molybdic oxide can be mixed with suitable ground carrier such as alumina, alumina-silica and the like in the presence of a suitable lubricant or binder and thereafter pilled or otherwise formed into larger agglomerated particles. These pills or particles are then subjected to a preliminary activation by heating at 600° C., for example, and are thereafter impregnated with an aqueous solution of cobalt nitrate to deposit the cobalt thereon. After draining and drying, the particles are heated to about 600° C. to form the catalyst.

The feed-stocks treated herein may comprise heating oils, stove oils, diesel oils, light or heavy gas oils, reduced crude oils, kerosene fractions, naphtha, especially heavy naphthas, any of which materials may be derived from petroleum, shale oil, tar sands, or coal hydrogenation. The feed stock should preferably boil over a range of at least 50° F., and preferably 100° F., and may contain from about 0.05% to 8.0% by weight of sulfur and up to about 0.4% by weight of nitrogen. Cracked or straight-run materials, or blends thereof may be treated.

Reference is now made to the accompanying drawings which illustrate some of the specific features of the invention. The invention should not however be construed as restricted to the details shown. Figure 1 illustrates an embodiment of the invention wherein both contact zones are maintained under essentially the same pressures, and where unrestricted gravity flow of liquid is permitted in the lower section. The reactor consists of an elongated, vertical cylindrical vessel 1 composed of mild steel or other suitable structural metal. Two separate beds of catalyst of the same or different particle sizes as desired are supported therein by means of perforated discs 2 and 3. Immediately below the upper supporting disc 2 is disposed an annular header member 4 containing perforations on the lower side thereof for the admission of feed mixture. An optional auxiliary header member 5 is provided between header 4 and lower supporting plate 3 for the admission of auxiliary hydrogen streams to the liquid phase conversion zone.

The feed stock for reactor 1 is brought in through line 6, admixed with the desired proportion of hydrogen from line 7, and passed via line 8 into flue gas heater 9 wherein the mixture is heated to reaction temperature. The hot mixture of liquid and vapor-phase feed plus hydrogen is then passed via line 11 into header member 4 from which the feed is sprayed gently downwardly onto the upper surface of the lower catalyst bed 12. The vertical length of the catalyst bed 12 is so chosen that, with the desired liquid phase feed rate, the gravitation thereof downwardly will provide the necessary contact time to achieve the desired conversion. The hold-up of liquid material in the catalyst bed may be varied somewhat by varying the upward flow of hydrogen, or by any other methods obvious to those skilled in the art. The liquid passes downwardly through catalyst bed 12 and perforated plate 3 and accumulates in the bottom of reactor 1, and is continuously withdrawn through line 14 controlled by valve 15 in response to liquid level controller 16.

The hydrogen required for the liquid phase desulfurization is obtained by opening valve 17, thereby permitting a part of the hydrogen from line 18 to flow through line 19, heater 9, line 20, compressor 21, and line 22 into the bottom of reactor 1 between the lower supporting plate 3 and the liquid surface level. The amount of hydrogen admitted through line 22 may be only sufficient to provide that necessary for the reaction, but should preferably be sufficiently in excess to provide slight agitation of the liquid, and may also be sufficiently excessive to vaporize a considerable portion of the descending liquid. If the latter alternative is chosen, a preferred modification consists in opening pressure reducing valve 23 to permit a portion of the hydrogen to pass through line 25 into header member 5. The introduction of hydrogen at a mid-point in catalyst bed 12 is advantageous in that any of the high boiling material which is vaporized will be mostly liquid which has not already undergone the desired desulfurization. If all the hydrogen required in the vapor phase zone were admitted through high pressure hydrogen inlet line 22, a considerable portion of already converted liquid hydrocarbons would be vaporized and passed through the vapor phase zone, thus lowering the over-all efficiency. It is therefore preferred to equilibrate the required hydrogen with the higher boiling hydrocarbons either before, or only shortly after, the inception of the liquid phase desulfurization. In this preferred alternative, it will be understood that the amount of hydrogen introduced through line 22 is only the amount required to keep the liquid phase saturated with hydrogen and to provide slight agitation.

The vapor phase flow direction is upward throughout the length of reactor 1. This is achieved by proper regulation of pressure differentials throughout the length of the reactor. The total admitted gaseous components, including hydrogen, pass upwardly through upper supporting disc 2 into upper catalyst bed 27 wherein vapor phase hydrodesulfurization takes place, uninhibited by the presence of a liquid phase. The combined vapor phase products are continuously passed via line 28, interchanger 29, line 30, condenser 31 and line 32 into high pressure separator 33 wherein liquid phase products are separated from high pressure recycle gas. The recycle gas is taken off through line 34 and passed in heat exchange relationship with the gaseous products in interchanger 29, to be mixed with fresh hydrogen supplied from line 35, the combined flow of recycle and fresh hydrogen passing into line 18 for re-use as above described.

The liquid condensate in separator 33 is then passed via line 36, pressure reducing valve 37, and line 38 into low pressure gas-liquid separator 39. The liquid product from the liquid phase conversion zone, which accumulates in the bottom of reactor 1 is also passed into separator 39 via pressure-reducing valve 15 and line 14. This high-boiling liquid fraction will ordinarily contain dissolved gases such as methane, hydrogen sulfide, hydrogen, etc. in proportions and amounts similar to that contained in the condensed liquid phase from separator 33. These residual gases are hence conveniently removed simultaneously. The low pressure gases which are separated in vessel 39 are ordinarily too dilute in hydrogen to be utilized economically for recycle. They are therefore taken off through line 40 to be used as fuel gas. The liquid in separator 39 is passed via line 41 to fractionating column 42 wherein any remaining light gases are taken off through overhead line 44 and utilized for example as fuel gas. The depentanized liquid in column 42 may be suitable for the desired use without further fractionation, for example as fuel oil, catalytic cracking stock, catalytic reforming stock, diesel fuel, etc. Alternatively, the liquid product may be fractionated to derive two or more desired products such as for example a gasoline boiling range product through line 45 and higher boiling material through line 46.

Figure 2:
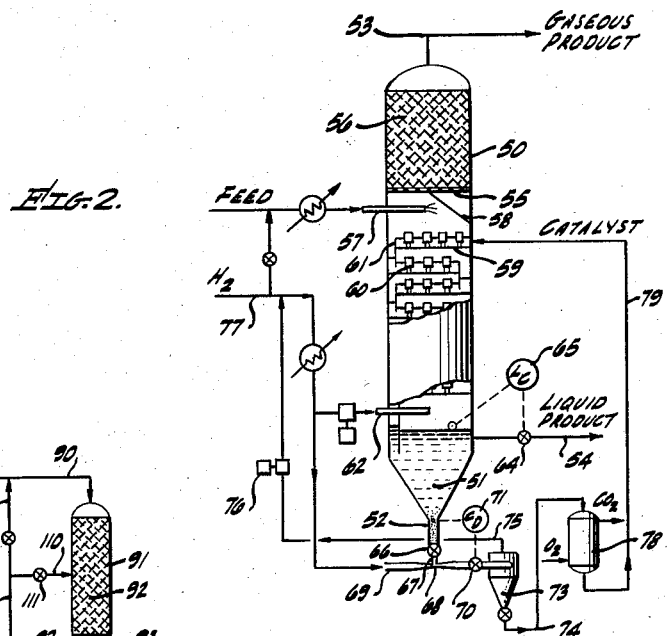

Referring now to Figure 2, this drawing illustrates a suitable process and apparatus for contacting the liquid phase with finely divided catalyst in a series of conversion stages. The principal piece of apparatus consists of a cylindrical column 50 composed of steel or other suitable structural material, and of any desired dimensions. The column 50 terminates toward its lower end in a frusto-conical settling chamber 51. Settling chamber 51 terminates in a small cylindrical standpipe 52 designed to facilitate the removal of catalyst. Column 50 is provided at its upper end with a vapor phase product outlet line 53, and a lower liquid phase product outlet line 54 located immediately above the settling chamber 51. Column 50 is divided into two principal sections by means of perforated supporting plate 55. A bed of granular catalyst 56 is supported on plate 55 and terminates slightly below gaseous product outlet line 53. Immediately below supporting plate 55 is provided a feed inlet pipe 57 which terminates inwardly a short distance from sloping deflector plate 58 attached to the walls of column 50.

Below feed inlet line 57 is provided a series of bubble cap trays 59 each containing a plurality of bubble caps 60 which may be of any conventional design to permit the upward flow of gases and prevent the downward flow of liquid. Each of the trays 59 is provided with a vertical weir 61 which permits flow of liquid downwardly to the next lower tray. The lower end of each weir 61 terminates below the liquid level of the subjacent tray so as to prevent back flow of gas. Below the lowermost of the trays 59 is provided a hydrogen inlet port 62, through which hydrogen is introduced for countercurrent flow against the descending liquid mixture.

The operation of the apparatus shown in Figure 2 is in general similar to that described in connection with Figure 1, except that in the present case it is preferable to admit at least a substantial part of the total hydrogen required in the process through the lower inlet line 62, thereby insuring efficient operation of the bubble cap trays 59. It will be understood that the vigorous agitation of bubble caps 60 caused by the flow of hydrogen thereunder and through the surrounding liquid creates vigorous agitation which in the case of large catalyst particles provides better liquid-solid contact, and in the case of smaller catalyst particles provides not only better contact but also keeps the catalyst at least partly suspended in the liquid so that it may flow downwardly with the liquid from one tray to the next. The downward flow rate of catalyst is preferably not as great as the liquid flow rate, and this factor may be controlled by varying the degree of agitation, the catalyst particle size, or by providing screens on the top portion of the weirs 61 to retain catalyst particles.

The liquid accumulating in settling zone 51 is continuously withdrawn through line 54 by the actuation of valve 64 in response to liquid level controller 65. The catalyst settling into the bottom of zone 51 tends to accumulate in standpipe 52, and is preferably withdrawn at a rate which responds to the quantity accumulated in standpipe 52. In the modification illustrated, the standpipe 52 terminates in a pressure relief valve 66 and a conduit 67 communicating with the throat 68 of a Venturi tube 69. Valve 66 is normally closed when the pressure in throat 68 is equal to the pressure in column 52. In order to withdraw catalyst a stream of hydrogen, or other gas, is circulated through line 69 by the opening of valve 70, thereby decreasing the pressure at throat 68 and causing the opening of valve 66. Valve 70 may be controlled for example by means of a conductivity detector controller 71 which responds to differences in the conductivity, or other electrical or thermal property of the fluid in standpipe 52. Since the catalyst has appreciably different electrical properties from the hydrocarbon fluid, it will be apparent that the opening of valve 70 may be readily controlled in response to changes in conductivity at any desired level in standpipe 52 at which detecting electrodes may be inserted.

The suspended mixture of hydrocarbon, catalyst and hydrogen in line 69 is then passed into a cyclone separator-dryer 73, wherein the liquid hydrocarbon is vaporized by the hot hydrogen, and the substantially dry catalyst is removed through line 74. The mixture of hydrogen and hydrocarbon is removed from the top of separator 73 through line 75, and repressured by means of pump 76 into the primary hydrogen supply line 77. It will thus be apparent that the hydrocarbon vaporized from the catalyst is continuously returned to the process. The dried catalyst in line 74 may then be passed into a regenerator 78 wherein deleterious deposits of carbon, sulfur, gums and the like may be removed by combustion with oxygen-containing gases. The regenerated catalyst is then transferred via line 79 to the uppermost bubble cap tray 59 to mingle with fresh liquid feed. It is not essential that all of the catalyst be regenerated with each pass through the reactor. In most cases the major part of the catalyst in line 74 may be returned directly to the reactor, and only a slipstream is regenerated in regenerator 78. Various other modes of utilizing the multi-stage liquid processing apparatus herein described will be apparent to those skilled in the art.

Figure 3:
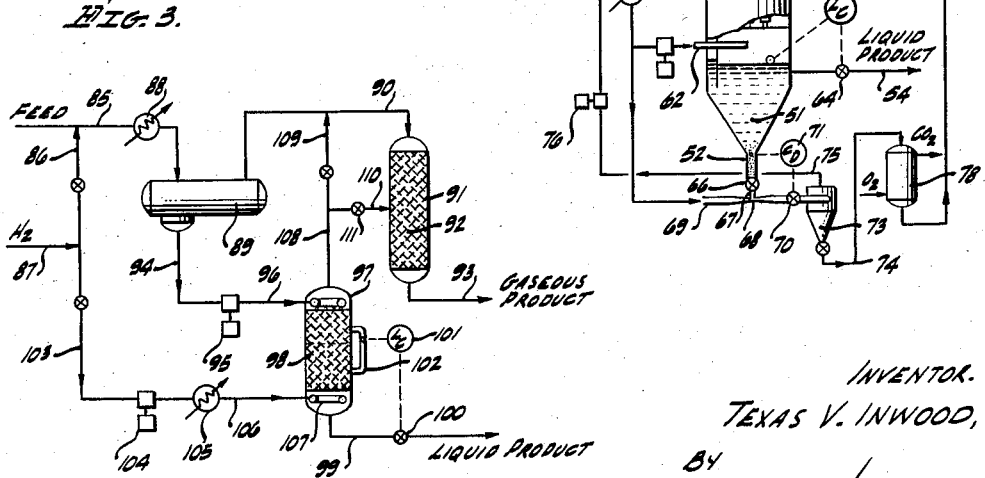

Referring now to Figure 3, this modification illustrates a suitable process arrangement for treating the liquid phase at a higher pressure than the vapor phase. The feed material is brought in through line 85 in admixture with hydrogen supplied via lines 87 and 86. The hydrogen supplied may comprise all or a part of that desired for the vapor phase conversion. The mixture in line 85 is then heated to the desired conversion temperatures in heater 88 and transferred at approximately the desired vapor phase conversion pressure to liquid-vapor separator 89. The vapor phase is transferred via line 90 to catalytic vapor phase reactor 91 containing a suitable granular catalyst 92. The treated vapor phase products are removed through line 93.

The liquid product accumulating in the bottom of separator 89 is then pressured, via line 94, pump 95 and line 96, into liquid phase catalytic reactor 97 containing a catalyst bed 98. Liquid product is withdrawn through line 99 at a rate controlled by valve 100. Valve 100 is actuated by liquid level controller 101 which is responsive to the liquid level in side-arm liquid level indicator 102. The hydrogen required for the desulfurization in reactor 97 is supplied via line 103, compressor 104, heater 105 and line 106 to a distributing ring 107 located in the bottom of reactor 97. In this modification it is preferred to supply only a slight excess of hydrogen over that required to keep the liquid phase saturated, although more may be employed if desired. The excess hydrogen plus entrained hydrocarbons is depressured and removed from reactor 97 through line 108 and either or both of lines 109 and 110. There is some advantage in passing the vapor phase stream from reactor 97 into the midsection of reactor 91 via line 110, inasmuch as those gases are usually substantially cooler than the reaction mixture in reactor 91 because of the expansion cooling resulting from release of the gases through back pressure regulator valve 111. The desulfurization reaction is exothermic in character and hence it is desirable to add a cooling medium at an intermediate stage of the reaction in order to provide a more nearly isothermal temperature profile in the reactor.

The liquid phase conversion in reactor 97 is substantially improved by the use of high pressures. It is feasible to employ pressures in reactor 97 which are about 500 to 6000 p. s. i. g. higher than in reactor 91. The reaction rate in reactor 97 increases substantially in direct proportion to the pressure employed, as a direct reflection of the increased solubility of hydrogen in the liquid feed.

In all of the above illustrated modifications it may be found that the catalyst employed in the liquid phase conversion is more rapidly fouled or deactivated than the catalyst in vapor phase conversion, i. e. in terms of volumes of liquid feed treated per volume of catalyst. It is found however that by employing somewhat lower temperatures in the liquid phase conversion the fouling of catalyst may be more nearly equalized in the two zones thereby avoiding the necessity for shutting down the entire treating plant in order to regenerate only one bed of the catalyst. Therefore, in those processes where fixed bed catalysts are employed in the liquid phase conversion, it is preferred that there should be about a 50 to 125° F. temperature differential between the two zones. However, in processes such as that illustrated in Figure 2 where the liquid phase catalyst is continuously regenerated, the liquid phase temperatures may be substantially the same or higher than the vapor phase conversion thereby permitting the use of higher space velocities for the liquid phase conversion, and decreasing the volume of catalyst and equipment required.

The following example may serve to illustrate some of the more important characteristics of the process but is not intended to be limitative in character.

*Example*

This example illustrates the results obtainable in the desulfurization of a straight run gas oil derived from a Santa Maria Valley crude, the gas oil having a boiling range of 400°–650° F., an A. P. I. gravity of 33.2°, a sulfur content of 2.3% by weight, and a nitrogen content of 0.3% by weight. Its Engler distillation characteristics are as follows:

| | B. P. ° F. |
|---|---|
| Init. | 396 |
| 10% | 445 |
| 30% | 462 |
| 50% | 480 |
| 70% | 510 |
| 90% | 580 |
| End | 650 |

The reactor consists of a cylindrical steel vessel 3 inches in inside diameter, having outlets at the upper and lower ends, a centrally located feed inlet port, and an auxiliary hydrogen inlet port 14 inches below said central inlet port. An upper catalyst bed 12 inches in length is disposed slightly above the central inlet port, and a lower catalyst bed 16 inches in height terminates slightly below the central inlet.

The catalyst in the upper bed consists of cobalt molybdate supported on ¼ inch pellets of synthetic alumina-silica gel comprising 95% by weight $Al_2O_3$ and 5% $SiO_2$. The catalyst in the lower bed consists of the same active ingredients supported on 1/16 inch alumina-silica pellets. Both catalysts are prepared by alternately impregnating the activated carriers, first with an aqueous solution of ammonium paramolybdate and then with a solution of cobalt nitrate. After drying and calcining at 600° C. for 4 hours, the finished catalysts are found to contain by weight about 3.1% CoO and 8.7% $MoO_3$.

The gas-oil feed stock is preheated to about 700° F., mixed with hydrogen supplied at a rate of 1800 s. c. f. per barrel of feed, and the resulting mixture is then raised to reaction temperature of 750° F. at the chosen reactor pressure of 500 p. s. i. g. The mixture is sufficiently agitated during the final heating and mixing to insure that the partial pressures of the components reach equilibrium. Under these conditions it is found that about 15 to 25% by volume of the feed remains in the liquid phase. The bi-phase mixture is then introduced into the central inlet port of the reactor at a rate corresponding to 8 volumes of original liquid feed per volume of total catalyst per hour. The liquid portion of feed percolates downwardly at an effective space velocity of about 2.8, while the vapor portion passes upwardly at an effective space velocity of about 15. A small auxiliary stream of preheated hydrogen, amounting to about 100 s. c. f. per barrel of total feed is passed upwardly countercurrently to the descending liquid-phase feed. Liquid product is removed from the lower outlet port, and gaseous product from the upper outlet port. The gaseous products are condensed and combined with the liquid product. Analysis of the combined product shows a sulfur content of 0.04% by weight (98.4% removal) and a nitrogen content of 0.08% (73.5% removal).

By repeating the above experiment with the same feed stock and under the same reaction conditions (8 LHSV), with the exception that the total feed plus hydrogen is introduced into the top of the reactor, and allowed to pass downwardly through both catalyst beds, the sulfur removal is only 89% and the nitrogen removal 65%. Moreover, the remaining sulfur compounds are found to be largely low-boiling compounds such as thiophene, showing that there was a decrease in vapor-phase desulfurization efficiency.

Substantially similar differential results are obtained in the desulfurization when other catalysts within the purview of the invention are employed. For example nickel sulfide-tungsten sulfide catalysts are also found to be more efficient for vapor phase conversion in the absence of liquid phase. Substantially similar results are also obtained under other process conditions.

The foregoing disclosure should therefore not be considered as limiting in scope since many variations may be made by those skilled in the art without departing from the scope or spirit of the following claims.

I claim:

1. In a method for the catalytic hydrodesulfurization of a mineral oil fraction containing hydrocarbon components which are normally liquid and hydrocarbon components which are normally gaseous under the conditions of temperature and pressure to be utilized in the hereinafter specified vapor-phase hydrodesulfurization, the improvement which comprises separating said mineral oil fraction into a vapor phase and a liquid phase in equilibrium with each other at approximately the conditions of pressure and temperature to be employed for said vapor-phase hydrodesulfurization, subsequently contacting said liquid phase with preheated hydrogen to evaporate further quantities thereof and to saturate said liquid phase with hydrogen, passing the combined vapor-phase mixture of hydrocarbons and hydrogen resulting from said separating and said contacting into a vapor-phase catalytic hydrodesulfurization zone which is free of any liquid phase, and which is maintained at a temperature between about 600° and 900° F. and a pressure between 0 and 10,000 p. s. i. g., passing said liquid phase into a separate liquid-phase catalytic hydrodesulfurization zone maintained at a temperature between about 500° and 800° F. and a pressure between about 500 and 12,000 p. s. i. g., supplying at least sufficient hydrogen to said liquid-phase hydrodesulfurization zone to maintain said liquid phase saturated with hydrogen during treatment, and withdrawing desulfurized liquid product and desulfurized gaseous product respectively from said liquid-phase and vapor-phase hydrodesulfurization zones, each of said hydrodesulfurization zones containing a granular catalyst including an active component selected from the class consisting of transitional metal oxides and sulfides.

2. A process as defined in claim 1 wherein each of said hydrodesulfurization zones contains a catalyst selected from the class consisting of group VIB and group VIII metal oxides and sulfides.

3. A process as defined in claim 1 wherein each of said hydrodesulfurization zones contains a catalyst selected from the class consisting of group VIB metal oxides and sulfides combined with a member selected from the class consisting of group VIII metal oxides and sulfides.

4. A process as defined in claim 1 wherein each of said hydrodesulfurization zones contains a catalyst consisting essentially of cobalt molybdate supported on an alumina-silica gel carrier.

5. In a method for the catalytic hydrodesulfurization of a mineral oil fraction containing hydrocarbon components which are normally liquid and hydrocarbon components which are normally gaseous under the conditions of temperature and pressure to be utilized in the hereinafter specified vapor-phase hydrodesulfurization, the improvement which comprises separating said mineral oil fraction into a vapor phase and a liquid phase in equilibrium with each other and in equilibrium with added hydrogen at approximately the conditions of pressure, temperature and hydrogen/oil ratio to be employed for said vapor phase hydrodesulfurization, passing the vapor-phase mixture of hydrocarbons and hydrogen resulting from said separating into a vapor-phase catalytic hydrodesulfurization zone which is free of any liquid phase, and which is maintained at a temperature between about 600° and 900° F. and a pressure between 0 and 10,000 p. s. i. g., passing said liquid phase into a separate liquid-phase catalytic hydrodesulfurization zone maintained at a temperature between about 500° and 800° F. and a pressure between about 500 and 12,000 p. s. i. g., supplying at least sufficient hydrogen to said liquid-phase hydrodesulfurization zone to maintain said liquid phase saturated with hydrogen during treatment, and withdrawing desulfurized liquid product and desulfurized gaseous product respectively from said liquid-phase and vapor-phase hydrodesulfurization zones, each of said hydrodedesulfurization zones containing a granular catalyst including an active component selected from the class consisting of transitional metal oxides and sulfides.

6. A process as defined in claim 5 wherein said separation of vapor phase and liquid phase is carried out in the presence of between about 500 and 3000 s. c. f. of hydrogen per barrel of liquid feed vaporized.

7. A process as defined in claim 5 wherein the liquid hourly space velocity in said vapor-phase hydrodesulfurization zone is between about 1 and 20, and the liquid hourly space velocity in said liquid phase hydrodesulfurization zone is between about 0.1 and 5.0.

8. A process as defined in claim 5 wherein said hydrogen supplied to said liquid-phase hydrodesulfurization zone is between about 50 and 1,000 s. c. f. per barrel of liquid feed treated therein, and is passed countercurrently to said liquid feed.

9. A process as defined in claim 5 wherein the pressure in said liquid-phase hydrodesulfurization zone is between 500 and 6,000 p. s. i. g., higher than in said vapor phase hydrodesulfurization zone.

10. In a method for the catalytic hydrodesulfurization of a mineral oil feed stock having an end-point substantially higher than 400° F. and containing hydrocarbon components which are normally liquid, and hydrocarbon components which are normally gaseous under the conditions of temperature and pressure to be utilized in the hereinafter specified vapor-phase hydrodesulfurization, the improvement which comprises effecting a single-stage fractionation of said feed stock in the presence of added hydrogen at approximately the conditions of temperature and pressure to be subsequently employed for said vapor-phase hydrodesulfurization, thereby forming a non-rectified liquid phase and a non-rectified vapor phase in equilibrium with each other, passing said vapor phase into a vapor-phase catalytic hydrodesulfurization zone which is free of any liquid phase, and which is maintained at a temperature between about 600° and 900° F. and a pressure between 0 and 10,000 p. s. i. g., passing said liquid phase into a separate liquid phase catalytic hydrodesulfurization zone maintained at a temperature between about 500° and 800° F. and a pressure between about 500 and 12,000 p. s. i. g. passing sufficient hydrogen countercurrently through said liquid-phase hydrodesulfurization zone to (1) maintain said liquid phase saturated with hydrogen and (2) supply at least a portion of the hydrogen required for said vapor phase hydrodesulfurization zone, separating from said liquid-phase hydrodesulfurization zone unabsorbed hydrogen saturated with hydrocarbons and commingling the same with said vapor-phase feed entering said vapor-phase hydrodesulfurization zone, supplying all the additional hydrogen required for said vapor-phase hydrodesulfurization zone to the aforesaid fractionation step, and withdrawing desulfurized liquid product and desulfurized gaseous product respectively from said liquid-phase and vapor-phase hydrodesulfurization zones, each of said hydrodesulfurization zones containing a granular catalyst including an active component selected from the class consisting of transitional metal oxides and sulfides.

11. A process as defined in claim 10 wherein said liquid phase is gravitated downwardly in said liquid phase hydrodesulfurization zone and wherein the major portion of said hydrogen added thereto is admitted between the upper and lower extremities thereof, and a minor portion of said hydrogen is admitted at the lower extremity of said liquid-phase hydrodesulfurization zone.

12. A process as defined in claim 10 wherein the total hydrogen supplied to said vapor-phase hydrodesulfurization zone is between about 200 and 8,000 s. c. f. per barrel of feed treated therein, and the total hydrogen supplied to said liquid phase hydrodesulfurization zone is between about 50 and 1,000 s. c. f. per barrel of feed treated therein.

13. A process as defined in claim 10 wherein the catalyst in said liquid phase hydrodesulfurization zone is more finely divided than the catalyst in said vapor-phase hydrodesulfurization zone.

14. A process as defined in claim 10 wherein said liquid-phase hydrodesulfurization zone is divided into a plurality of separate treating stages, said liquid feed passing downwardly from stage to stage countercurrently to said hydrogen.

15. A process as defined in claim 10 wherein said liquid phase hydrodesulfurization zone is divided into a plurality of separate treating stages, each stage containing finely divided catalyst in the form of a slurry with said liquid feed, said slurry descending from stage to stage countercurrently to said hydrogen.

16. In a method for the catalytic hydrodesulfurization of a mineral oil fraction containing hydrocarbon components which are normally liquid and hydrocarbon components which are normally gaseous under the conditions of temperature and pressure to be utilized in the hereinafter specified vapor-phase hydrodesulfurization, the improvement which comprises separating said mineral oil fraction into a vapor phase and a liquid phase in equilibrium with each other and in equilibrium with added hydrogen at approximately the conditions of pressure and temperature to be employed for said vapor-phase hydrodesulfurization, passing the vapor-phase mixture of hydrocarbons and hydrogen resulting from said separating into a vapor-phase catalytic hydrodesulfurization zone which is free of any liquid phase, and which is maintained at a temperature between about 600° and 900° F. and a pressure between 0 and 10,000 p. s. i. g., passing said liquid phase into a separate liquid-phase catalytic hydrodesulfurization zone maintained at a temperature between about 500° and 800° F. and a pressure between about 500 and 12,000 p. s. i. g., supplying at least sufficient hydrogen to said liquid-phase hydrodesulfurization zone to maintain said liquid phase saturated with hydrogen during treatment, and withdrawing desulfurized liquid product and desulfurized gaseous product respectively from said liquid-phase and vapor-phase hydrodesulfurization zones, each of said hydrodesulfurization zones containing a granular catalyst including an active component selected from the class consisting of transitional metal oxides and sulfides.

References Cited in the file of this patent

UNITED STATES PATENTS

| | | |
|---|---|---|
| 1,792,003 | Dickey et al. | Feb. 10, 1931 |
| 1,881,534 | Harding | Oct. 11, 1932 |
| 1,901,158 | Gray | Mar. 14, 1933 |
| 2,130,596 | Ocon | Sept. 20, 1938 |
| 2,132,151 | Fenske et al. | Oct. 4, 1938 |
| 2,174,510 | Gwynn | Oct. 3, 1939 |
| 2,273,482 | Campbell | Feb. 17, 1942 |
| 2,538,001 | Hoffman | Jan. 16, 1951 |
| 2,587,987 | Franklin | Mar. 4, 1952 |
| 2,606,141 | Meyer | Aug. 5, 1952 |